United States Patent
Ukita et al.

[11] Patent Number: 6,061,112
[45] Date of Patent: May 9, 2000

[54] METHOD OF FABRICATING A REFLECTION TYPE LIQUID CRYSTAL DISPLAY IN WHICH THE SURFACE OF A SUBSTRATE IS ROUGHENED, A METAL FILM IS FORMED ON THE ROUGHENED SURFACE, AND A NON-POLARIZING, TRANSPARENT DIELECTRIC FILM IS FORM ON THE METAL FILM

[75] Inventors: Tooru Ukita; Shin Koide, both of Tokyo, Japan

[73] Assignee: NEC Corporation, Tokyo, Japan

[21] Appl. No.: 09/228,396

[22] Filed: Jan. 12, 1999

Related U.S. Application Data

[62] Division of application No. 08/964,990, Nov. 5, 1997.

[30] Foreign Application Priority Data

Nov. 5, 1996 [JP] Japan ................................. 8-292408

[51] Int. Cl.[7] .................................................. G02F 1/1335
[52] U.S. Cl. ............................................ 349/113; 349/158
[58] Field of Search ................................. 349/113, 114, 349/158, 160

[56] References Cited

FOREIGN PATENT DOCUMENTS

| | | |
|---|---|---|
| 59-100488 | 6/1984 | Japan . |
| 5-80327 | 4/1993 | Japan . |
| 6-235910 | 8/1994 | Japan ...................................... 349/113 |
| 7-306404 | 11/1995 | Japan . |

OTHER PUBLICATIONS

Bahadur, Liquid Crystals: Applications and Uses, pp. 397–436.

*Primary Examiner*—James A. Dudek
*Attorney, Agent, or Firm*—Sughrue, Mion, Zinn, Macpeak & Seas, PLLC

[57] ABSTRACT

There is provided a reflection type liquid crystal display including (a) a first substrate having a roughened surface, (b) a second substrate spaced away from the first substrate in opposing relation to the roughened surface of the first substrate, (c) a liquid crystal layer sandwiched between the first and second substrates, (d) a metal film formed on the roughened surface of the first substrate for reflecting lights therefrom, (e) a transparent dielectric film formed on the metal film, the transparent dielectric film having a planarized upper surface, (f) a plurality of transparent pixel electrodes formed on the transparent dielectric film, and (g) a plurality of switching devices formed on the transparent dielectric film, each of the switching devices being electrically connected with each of the transparent pixel electrodes, the transparent pixel electrodes and the switching devices being arranged in a matrix. The above-mentioned reflection type liquid crystal display makes it possible to provide an excellent light diffusion and reflection function without special technique. In particular, it is possible to reduce the number of photolithography steps for fabricating an active matrix type substrate, ensuring lower fabrication costs and a higher fabrication yield.

18 Claims, 4 Drawing Sheets

METHOD OF FABRICATING A REFLECTION TYPE LIQUID CRYSTAL DISPLAY IN WHICH THE SURFACE OF A SUBSTRATE IS ROUGHENED, A METAL FILM IS FORMED ON THE ROUGHENED SURFACE, AND A NON-POLARIZING, TRANSPARENT DIELECTRIC FILM IS FORM ON THE METAL FILM

This is a divisional of application Ser. No. 08/964,990 filed Nov. 5, 1997, the disclosure of which is incorporated herein by reference

BACKGROUND OF THE INVENTION

1. Field of the Invention

The invention relates to a liquid crystal display, and more particularly to a reflection type liquid crystal display including an active matrix type display having a thin film transistor as a switching device, and a passive matrix type without a switching device. The invention also relates to a method of fabricating such a reflection type liquid crystal display.

2. Description of the Related Art

In recent years, a liquid crystal display has been widely used for a pocket-type TV set and terminal devices for communication by virtue of its small thickness and light weight. A reflection type liquid crystal display without necessity of using a back light is in particular in demand because it is ultra-thin and light-weight, and it can significantly reduce power consumption. However, even if a back light is removed out of a presently available transmission type color liquid crystal display and a light reflection plate is added to a lower surface of the display, it would cause a problem that an efficiency of utilizing lights is low, and it is not possible to have practical brightness.

As a solution to this problem, there have been suggested various reflection type liquid crystal displays for enhancing an efficiency of utilizing lights. For instance, a certain reflection type liquid crystal display is designed to include a pixel electrode having reflection function, and another is designed to include no polarizing plates.

For another instance, a reflection type liquid crystal display suggested in "Bright Reflective Multicolor LCDs addressed by a-Si TFTs" by S. Mitsui et al., Society for Information Display '92 Digest, pp. 437–440, is of a type where guest-host type liquid crystal including dichroism pigment is used as raw material for liquid crystal. FIG. 1 illustrates a structure of the suggested reflection type liquid crystal display.

The illustrated reflection type liquid crystal display includes an insulating substrate 41 and an opposing substrate 13 spaced away from the insulating substrate 41. A space between the substrates 41 and 13 is filled with liquid crystal 10. A color filter 12 is disposed on the substrate 13, and a transparent common electrode 11 is formed on the color filter 12. A gate electrode 9 is formed on the insulating substrate 41, and both the gate electrode 9 and the insulating substrate 41 are covered with a gate insulating film 8. A semiconductor layer 7 is formed on the gate insulating film 8 above the gate electrode 9. A source electrode 4 and a drain electrode 5 are also formed on the gate insulating film 8 in contact with the semiconductor layer 7. The source electrode 4, the drain electrode 5, the semiconductor layer 7, and the gate electrode 9 cooperate with one another to thereby constitute a bottom gate type thin film transistor (hereinafter, "thin film transistor" is referred to simply as "TFT").

An interlayer insulating film 42 is formed covering the source electrode 4, the drain electrode 5, the semiconductor layer 7, and the gate insulating film 8 therewith. A contact hole 44 is formed throughout the interlayer insulating film 42. A pixel electrode 43 made of aluminum is formed on both the interlayer insulating film 42 and an inner sidewall of the contact hole 44.

The drain electrode 5 of TFT is in contact with the pixel electrode 43 through the interlayer insulating film 42. As illustrated, the interlayer insulating layer 42 is designed to have a roughened surface by which the pixel electrode 43 acts as a reflection plate for diffusing lights therearound. Lights having been reflected from the pixel electrode 43 transmit through or are absorbed in the guest-host type liquid crystal layer 10.

The reflection type liquid crystal display illustrated in FIG. 1 remarkable enhances an efficiency of using lights by virtue that a polarizing plate is no longer necessary to be provided, and that the pixel electrode 43 acts as a light reflection plate.

What is important in the illustrated reflection type liquid crystal display is that the pixel electrode 43 as a light reflection plate is designed to have a roughened surface. If the pixel electrode 43 were designed to have a flat reflection surface, reflected lights would have more intense orientation, which causes an angle suitable for viewing a display (hereinafter, such an angle is referred to as "angle of visibility") to become narrower, and which in addition causes scenery to reflect at the pixel electrode 43 as it is like a plane mirror. As a result, there is caused a problem that a display cannot be seen well.

Thus, it is important that a light-reflection surface is roughened or designed to have projections and recesses to thereby uniformly scatter lights therearound. However, if the interlayer insulating layer 42 were designed to have projections and recesses to thereby provide the pixel electrode 43 with a plate for scattering and diffusing lights as suggested in the above-mentioned reflection type liquid crystal display illustrated in FIG. 1, it would be unavoidable for fabrication steps to become complicated, and as a result there would be caused a problem of an increase in fabrication costs.

In the above-mentioned reflection type liquid crystal display, the interlayer insulating film 42 is designed to have projections and recesses by photolithography. However, it is quite difficult to form and control a fine shape of the projections and recesses in micrometer order by photolithography, and hence the projections and recesses tend to become a trapezoid. In addition, there is another problem that it is not possible to have a uniform characteristic of reflection and scattering.

The reflection type liquid crystal display illustrated in FIG. 1 further has problems as follows. Firstly, it is quite difficult to form the contact hole 44 connecting the drain electrode 5 to the pixel electrode 43 through the interlayer insulating film 42. Secondly, at least six photolithography steps have to be carried out in order to form the active matrix substrate 41 on which TFT, the pixel electrodes 43 and so on are formed. In other words, six different masks are necessary to prepare, and exposure, development and etching steps have to be carried out six times, both of which causes an increase in a fabrication cost and a reduction in a fabrication yield. In addition, errors in registration between masks and the substrate have to be taken into account. As a result, it is quite difficult to form an active matrix substrate larger in size.

In order to solve the above-mentioned problems, Japanese Unexamined Patent Publication No. 4-338721 has suggested a reflection film made of a multi-layered dielectric film, for instance. The suggested reflection film brings an advantage that an efficiency of using lights can be enhanced by controlling reflectance of a mirror composed of the multi-layered dielectric film. However, since the mirror composed of the multi-layered dielectric film, acting as a light reflection plate, has a poor characteristic of light scattering, reflected lights have intense orientation, and accordingly a broader angle of visibility cannot be obtained.

Japanese Unexamined Patent Publication No. 7-306404 has suggested a liquid crystal display having a light diffusion film formed on a top surface of a transparent pixel electrode, and a plane reflection plate disposed at the rear of the transparent pixel electrode. However, in the suggested liquid crystal display, lights externally transmitted are scattered by the light reflection film formed on a top surface of the pixel electrode, before the lights are introduced into a liquid crystal layer. Hence, the suggested liquid crystal display cannot sufficiently provide display function utilizing birefringence of liquid crystal. In addition, a photolithography step has to be carried out seven times for fabricating the liquid crystal display, which causes problems of an increase in a fabrication cost and a reduction in a fabrication yield. It would be difficult to form a substrate larger in accordance with the suggested liquid crystal display.

As discussed above, the conventional liquid crystal displays have many problems. An advantageous process for readily fabricating a reflection surface having projections and recesses is to roughen an insulating substrate, namely, to use so-called ground glass. A reflection surface having projections and recesses could be readily fabricated, for instance, by forming an aluminum film on a roughened insulating substrate. However, if the reflection surface were fabricated in such a manner, a thin film transistor has to be fabricated on projections and recesses, as described in Japanese Unexamined Patent Publication No. 59-100488. Accordingly, halation tends to readily take place when a reflection plate is exposed to lights in a photolithography step, which would cause a problem of a design rule being restricted. In addition, there is another problem that the projections and recesses would cause deterioration in transistor performances and reduction in a fabrication yield.

As a solution to those problems, the Japanese Unexamined Patent Publication No. 59-100488 has also suggested that, in a substrate, an area on which TFT is to be formed remains flat, and only an area on which a pixel electrode is to be formed is formed to have projections and recesses. However, this is not an appropriate solution, because a quite complicated photo-etching step has to be carried out for remaining the first mentioned area flat. In addition, at least seven photolithography steps have to be carried out for fabricating an active matrix substrate, causing the problems as mentioned earlier. That is, a fabrication cost would be increased, and it would be difficult to form the active matrix substrate larger in size.

As mentioned above, the prior art has to carry out a complicated photo-etching step for fabricating projections and recesses at a surface of a substrate to thereby have a reflection plate having sufficient light diffusion performance, which would cause a problem of an increased fabrication cost. In addition, it would be quite difficult to control a reflection characteristic of the reflection plate.

Furthermore, a photolithography step has to be carried out at least six times for fabricating an active matrix substrate including a thin film transistor and a reflection plate. Hence, at least six different masks have to be prepared, and exposure and development steps have to be carried out at least six times. This causes an increase in a fabrication cost and a reduction in a fabrication yield. In addition, errors in registration between masks and a substrate have to be taken into account, resulting in that it is quite difficult to form an active matrix substrate larger in size.

SUMMARY OF THE INVENTION

In view of the foregoing problems of the prior art, it is an object of the present invention to provide a reflection type liquid crystal display which includes a light diffusion and reflection plate having projections and recesses formed at a surface thereof and also having excellent reflection characteristic.

Another object of the present invention is to provide a reflection type liquid crystal display which is capable of reducing the number of photolithography steps required for fabricating an active matrix substrate including a thin film transistor, and hence which can be fabricated at lower costs at a higher fabrication yield.

In one aspect of the invention, there is provided a reflection type liquid crystal display including (a) a first substrate having a roughened surface, (b) a second substrate spaced away from the first substrate in opposing relation to the roughened surface of the first substrate, (c) a liquid crystal layer sandwiched between the first and second substrates, (d) a metal film formed on the roughened surface of the first substrate for reflecting lights therefrom, (e) a transparent dielectric film formed on the metal film, the transparent dielectric film having a planarized upper surface, and (f) at least one transparent pixel electrode formed on the transparent dielectric film.

It is preferable that projections and recesses formed at the roughened surface have a difference in height in the range of 0.1 $\mu$m to 5 $\mu$m both inclusive. It is also preferable that the projections and recesses are formed at a pitch in the range of 0.5 $\mu$m to 50 $\mu$m both inclusive. It is further preferable that the projections and recesses are formed to have a curved surface or are shaped in wave-form.

For instance, the transparent dielectric film may be made of polyimide family resin. The first substrate may be a glass substrate, for instance. The second substrate may include a transparent insulating substrate, a color filter disposed on the transparent insulating substrate, a transparent, electrically conductive film formed on the color filter, and an orientation film formed on the electrically conductive film.

There is further provided a reflection type liquid crystal display including (a) a first substrate having a roughened surface, (b) a second substrate spaced away from the first substrate in opposing relation to the roughened surface of the first substrate, (c) a liquid crystal layer sandwiched between the first and second substrates, (d) a metal film formed on the roughened surface of the first substrate for reflecting lights therefrom, (e) a transparent dielectric film formed on the metal film, the transparent dielectric film having a planarized upper surface, (f) a plurality of transparent pixel electrodes formed on the transparent dielectric film, and (g) a plurality of switching devices formed on the transparent dielectric film, each of the switching devices being electrically connected with each of the transparent pixel electrodes, the transparent pixel electrodes and the switching devices being arranged in a matrix.

It is preferable that the metal film is formed partially on the roughened surface of the first substrate. For instance, the metal film may be formed almost only below the transparent pixel electrodes. As an alternative, the metal film may be formed on the roughened surface of the first substrate so that the metal film does not exist below the switching devices.

There is still further provided a reflection type liquid crystal display including (a) a first substrate having a roughened surface, (b) a second substrate spaced away from the first substrate in opposing relation to the roughened surface of the first substrate, (c) a liquid crystal layer sandwiched between the first and second substrates, (d) a metal film formed on the roughened surface of the first substrate for reflecting lights therefrom, (e) a transparent dielectric film formed on the metal film, the transparent dielectric film having a planarized upper surface, (f) a plurality of transparent pixel electrodes formed on the transparent dielectric film, (g) a plurality of switching devices formed on the transparent dielectric film, each of the switching devices being electrically connected with each of the transparent pixel electrodes, the transparent pixel electrodes and the switching devices being arranged in a matrix, and (h) a film sandwiched between the transparent dielectric film and the switching devices for preventing the switching devices from making direct contact with the transparent dielectric film.

The inorganic film may be made of silicon compound such as silicon dioxide and silicon nitride. It is preferable that the inorganic film has a thickness in the range of 0.03 $\mu$m to 0.2 $\mu$m both inclusive.

In another aspect of the invention, there is provided a method of fabricating a substrate for a reflection type liquid crystal display, including the steps of (a) roughening a surface of a substrate, (b) forming a metal film on the thus roughened surface of the substrate for reflecting lights therefrom, (c) forming a transparent dielectric film on the metal film so that the transparent dielectric film has a planarized upper surface, and (d) forming at least one transparent pixel electrode on the transparent dielectric film.

It is preferable that the first step (a) includes the steps of (a-1) mechanically polishing a surface of the substrate, and (a-2) treating the thus mechanically polished surface with chemicals for smoothing sharpened portions thereof. Garnet is preferable used for mechanically polishing a surface of the substrate in the step (a-1). A surface of the substrate may be mechanically polished by being rubbed with sand in the step (a-1). As an alternative, a surface of the substrate may be mechanically polished by means of sand blasting in the step (a-1). As chemicals used in the step (a-2), there may be used hydrofluoric acid or buffered hydrogen fluoride.

It is preferable that the metal film is formed on the roughened surface of the substrate by sputtering in the step (b). For instance, the transparent dielectric film may be formed by spin-coating polymer on the metal film, in which case, the transparent dielectric film may be formed by the steps of applying liquid prepolymer on the metal film, spreading the prepolymer on the metal film so that the prepolymer has an almost uniform thickness, and curing the prepolymer.

The polymer may be selected from at least one of polyamide, polyimide, polyester, acrylic resin, epoxy resin, silicone resin, and polysilazane.

There is further provided a method of fabricating a substrate for a reflection type liquid crystal display, including the steps of (a) roughening a surface of a substrate, (b) forming a metal film on the thus roughened surface of the substrate for reflecting lights therefrom, (c) forming a transparent dielectric film on the metal film so that the transparent dielectric film has a planarized upper surface, (d) forming a plurality of transparent pixel electrodes on the transparent dielectric film, and (e) forming a plurality of switching devices on the transparent dielectric film so that each of the switching devices is electrically connected with each of the transparent pixel electrodes, and that the transparent pixel electrodes and the switching devices are arranged in a matrix.

For instance, the step (e) further includes the steps of (e-1) forming a transparent, electrically conductive film on the transparent dielectric film, (e-2) patterning the transparent, electrically conductive film into pixel source, and drain electrodes, (e-3) forming a semiconductor film, a gate insulating film, and a metal film over the thus patterned electrically conductive film and the transparent dielectric film, and (e-4) patterning the thus formed films into gate electrodes.

It is preferable that the metal film is formed partially on the roughened surface of the first substrate in the step (a). For instance, the metal film may be formed almost only below the transparent pixel electrodes. As an alternative, the metal film may be formed on the roughened surface of the first substrate so that the metal film does not exist below the switching devices, for instance, by removing unnecessary portions of the metal film by photolithography and etching.

There is still further provided a method of fabricating a substrate for a reflection type liquid crystal display, including the steps of (a) roughening a surface of a substrate, (b) forming a metal film on the thus roughened surface of the substrate for reflecting lights therefrom, (c) forming a transparent dielectric film on the metal film so that the transparent dielectric film has a planarized upper surface, (d) forming a film on the transparent dielectric film, (e) forming a plurality of transparent pixel electrodes on the inorganic film, and (f) forming a plurality of switching devices on the inorganic film so that each of the switching devices is electrically connected with each of the transparent pixel electrodes, and that the transparent pixel electrodes and the switching devices are arranged in a matrix.

For instance, the film may be an inorganic film, and may be formed to have a thickness in the range of 0.03 $\mu$m to 0.2 $\mu$m both inclusive.

In accordance with the invention, a substrate having projections and recesses and acting as a light diffusion and reflection plate can be fabricated by simple steps such as mechanically polishing a surface of insulating material such as glass, treating the thus polished glass with chemicals such as hydrogen fluoride, and forming a metal film on the thus treated surface of glass. In addition, it is possible to control shapes of the projections and recesses by varying conditions for polishing and treating with chemicals, and hence it is also possible to control an angle of visibility and reflectance of a liquid crystal display.

Even if a substrate is formed to have projections and recesses, it would be possible to form a thin film transistor on the substrate, for instance, by planarizing a surface of the substrate by spin-coating polyimide resin.

In addition, in accordance with the above-mentioned invention, it is possible to fabricate an active matrix substrate by carrying out photolithography steps two or three times. Thus, the number of masks and the number of fabrication steps can be significantly reduced, which ensures that a fabrication cost is reduced and a fabrication yield is enhanced. Since errors in registration between masks and a substrate can be reduced, a problem that a design rule is restricted can be solved, which ensures that a substrate can be formed larger in size.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

In a reflection type liquid crystal display in accordance with the invention, a pair of insulating substrates such as a glass substrate are disposed in opposing relation with a liquid crystal layer sandwiched therebetween. A light transmitted through an upper substrate is reflected and diffused by a light diffusion and reflection plate formed on a lower substrate to thereby make a display. Herein, the light diffusion and reflection plate is formed of a substrate having projections and recesses at a surface thereof, and a metal film such as an aluminum film, for instance. A transparent dielectric film having a planarized surface is formed on the substrate having projections and recesses, and a switching device such as a thin film transistor is fabricated. Thus, a reflection type liquid crystal display having an active matrix type substrate can be formed in a simpler structure.

The invention may be applied to a reflection type liquid crystal display having a passive matrix type substrate. In this passive matrix type liquid crystal display, a transparent dielectric film is formed by spin-coating on a light diffusion and reflection plate having projections and recesses, and there is not formed a switching device on the transparent dielectric film. The liquid crystal display works in dependence on variation in an effective voltage applied to liquid crystal. By forming the transparent dielectric film thick by spin-coating, a parasitic capacity between a light diffusion and reflection plate and a wiring or a pixel electrode can be decreased.

[Embodiment 1]

Figure 1:
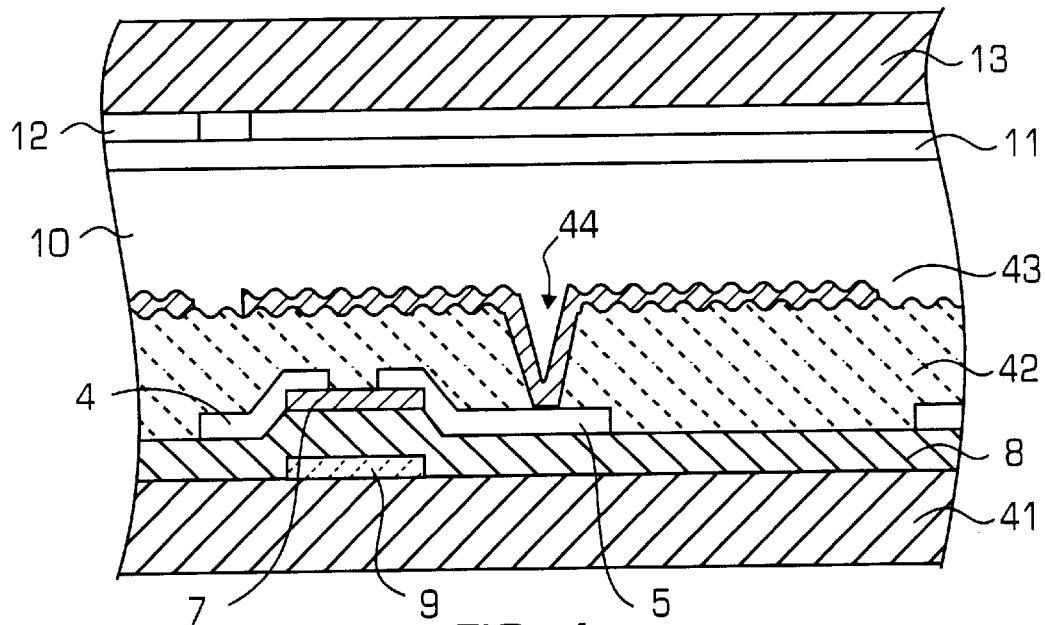
FIG. 1 is a cross-sectional view of a conventional reflection type liquid crystal display.
Figure 2:
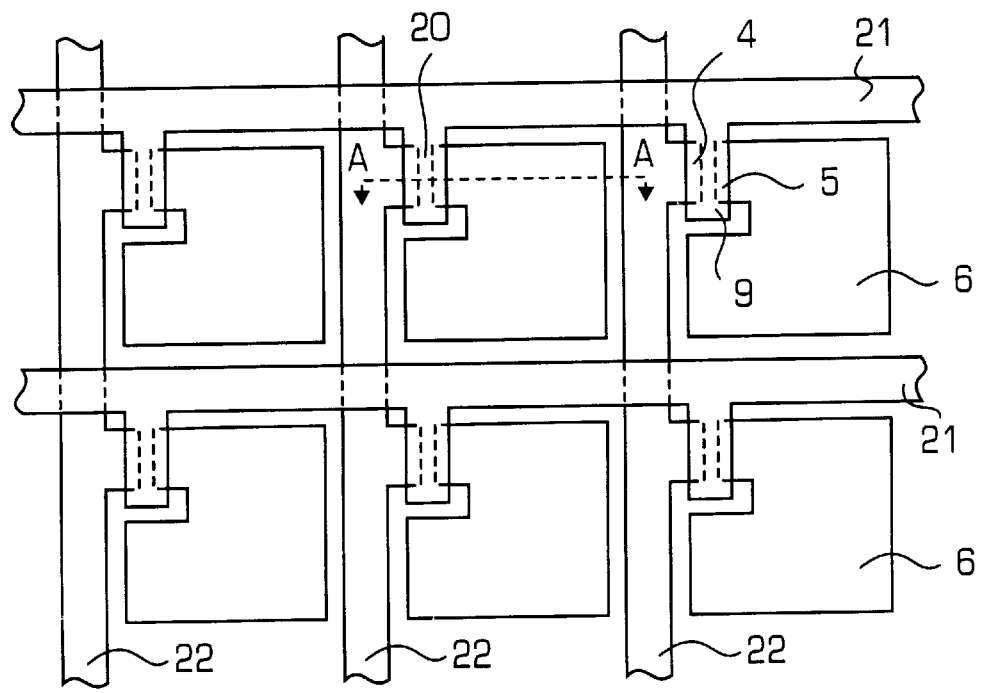
FIG. 2 is a partial plane view of an active matrix substrate for a reflection type liquid crystal display in accordance with the first embodiment of the invention.
Figure 3:
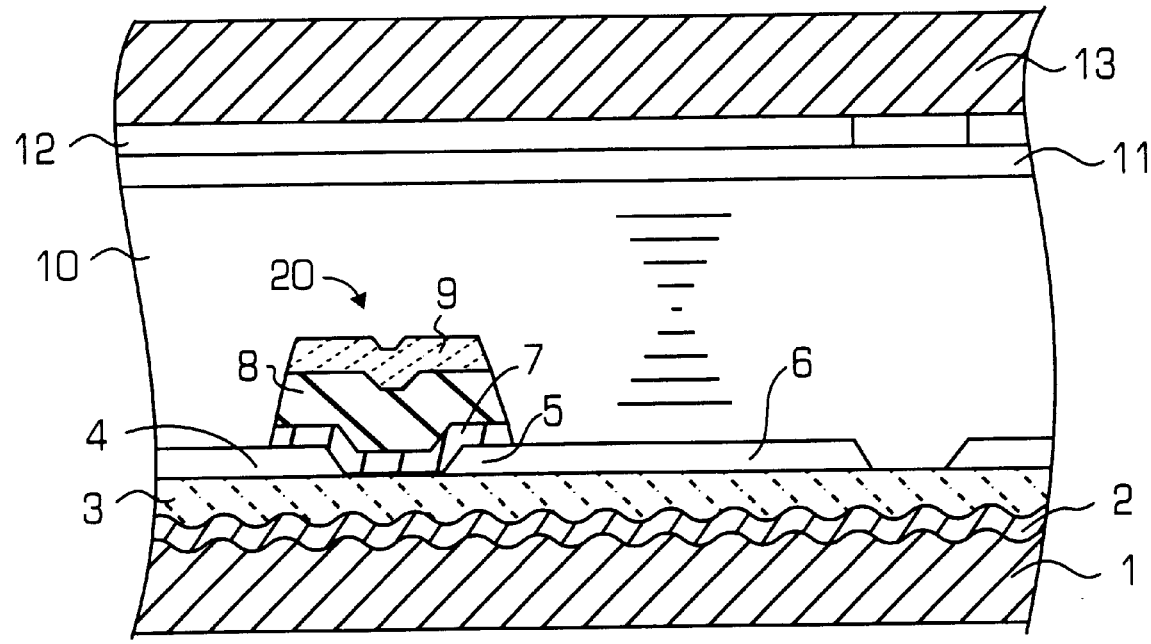
FIG. 3 is a cross-sectional view taken along the line A—A in FIG. 2.

FIG. 2 illustrates an active matrix substrate for a reflection type liquid crystal display in accordance with the first embodiment, and FIG. 3 is a cross-sectional view taken along the line A—A in FIG. 2.

As illustrated in FIG. 3, an active matrix substrate in the instant embodiment includes an insulating substrate 1 having an upper surface roughened or having projections and recesses, a metal film 2 formed all over the insulating substrate 1 and made of metal such as aluminum, silver, gold and copper, a transparent dielectric film 3 formed all over the metal film 2, made of polyimide family resin, and designed to have a planarized surface, a plurality of transparent pixel electrodes 6 formed on the transparent dielectric film 3 and made of ITO (indium-tin-oxide), a thin film transistor (hereinafter, referred to simply as "TFT") 20 formed on the transparent dielectric film 3, and an orientation film (not illustrated) formed over the active matrix type substrate and treated for orienting liquid crystal molecules.

As illustrated in FIG. 2, there are formed a plurality of gate bus wirings 21 and a plurality of source bus wirings 22 on the active matrix substrate. The gate bus wirings 21 are made of chromium, tantalum, molybdenum or aluminum, and arranged in parallel with one another. The source bus wirings 22 are made of ITO, and arranged in parallel with one another and perpendicularly to the gate bus wirings 21. A thin film transistor (TFT) 20 is formed as a switching device at each of intersections of the gate bus wirings 21 and the source bus wirings 22. A portion 9 extending from each of the gate bus wirings 21 constitutes a gate electrode of TFT 20, and a portion 4 extending from each of the source bus wirings 22 constitutes a source electrode of TFT 20. As illustrated in FIG. 3, each of the drain electrodes 5 of TFT 20 is in connection with the each of the transparent pixel electrodes 6.

TFT 20 has the following structure. A source electrode 4 and a drain electrode 5 both made of a transparent, electrically conductive film such as an ITO film are formed on the transparent dielectric film 3. The drain electrode 5 is in connection with the pixel electrode 6. On the source and drain electrodes 4 and 5 is formed an amorphous silicon semiconductor layer 7 so that it is in connection with both the source and drain electrodes 4 and 5. A gate insulating film 8 made of silicon nitride is formed on the semiconductor layer 7, and a gate electrode 9 made of metal such as chromium, tantalum, molybdenum and aluminum is formed on the gate insulating film 8.

A substrate disposed in opposing relation to the active matrix substrate includes a transparent insulating substrate 13 made of glass, a color filter 12 formed on the substrate 13, a common electrode 11 made of a transparent, electrically conductive film such as an ITO film and formed on the color filter 12, and an orientation film (not illustrated) formed on the common electrode 11.

The reflection type liquid crystal display having the above-mentioned structure is fabricated as follows.

Figure 4:
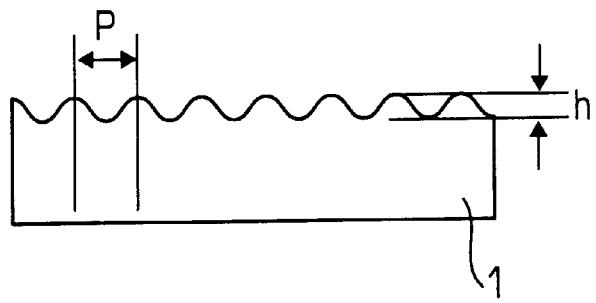
FIG. 4 is an enlarged cross-sectional view of the substrate of the reflection type liquid crystal display in accordance with the first embodiment.

First, a surface of a glass substrate is mechanically roughened. For instance, a glass substrate is rubbed with sand at a surface thereof. Rubbing with sand is generally used for fabricating a flat glass. However, even if a glass substrate is mechanically polished by being rubbed with sand, a difference in height between a bottom of a recess and a summit of a projection, and a pitch between summits of adjacent projections become merely about 0.1 μm. Thus, garnet powder is employed for polishing a substrate in the instant embodiment to thereby obtain the difference in height in the range of 1 μm to 2 μm both inclusive, and the pitch in the range of 5 μm to 15 μm. Herein, garnet is silicate mineral of aluminum, iron and so on. Herein, with reference to FIG. 4, a difference in height between a bottom of a recess and a summit of a projection is defined as a height "h", and a pitch between summits of adjacent projections is defined as a length "p".

Then, the thus roughened glass substrate is immerged into liquid chemicals such as hydrofluoric acid and buffered hydrogen fluoride. Since the roughened surface of the glass substrate has sharpened projections and recesses by mechanical polishing, they are smoothed by treatment with chemicals for the purpose of enhancing coverage of the metal film 2 to be later formed on the glass substrate and uniformizing light diffusion of the metal film 2. The difference in height between a bottom of a recess and a summit of a projection varies in dependence of specific chemicals and/or time during which the glass substrate is immerged into chemicals. In the instant embodiment, the difference in height in the range of 1 $\mu$m to 2 $\mu$m is made to change into a difference in height in the range of 0.4 $\mu$m to 1.2 $\mu$m by immerging the substrate into 10% hydrofluoric acid by five minutes.

By the above-mentioned simple steps, the glass substrate is designed to have a smoothly roughened surface having projections and recesses a difference in height of which is in the range of 0.4 $\mu$m to 1.2 $\mu$m, and a pitch of which is in the range of 5 $\mu$m to 15 $\mu$m.

Then, aluminum, silver, gold, copper or alloy mainly containing them is deposited on the glass substrate by sputtering to thereby form a metal film having high reflectance by a thickness in the range of 0.1 $\mu$m to 1 $\mu$m. The thus formed metal film acts as a light diffusion and reflection plate 2.

Then, a transparent dielectric film 3 made of polyimide family resin is formed on the metal film 2 by spin-coating by a thickness in the range of 2 $\mu$m to 5 $\mu$m to thereby planarize the roughened surface of the glass substrate 1. Specifically, viscous liquid prepolymer is applied onto the metal film 2, and then is spread by means of a spin-coater so that the prepolymer has almost uniform thickness all over the glass substrate 1. Then, the glass substrate 1 is kept in a kiln at 250° C. for 30 minutes, for instance, to thereby cure the prepolymer. Thus, there is formed the transparent dielectric film 3 having a planarized surface.

Then, a transparent, electrically conductive film made of ITO is formed over the transparent dielectric film 3 by sputtering by a thickness in the range of 0.01 $\mu$m to 0.3 $\mu$m. Then, the thus formed electrically conductive film is patterned by photolithography and dry etching to thereby form the source bus wirings 22, the source electrode 4, the drain electrode 5, and the pixel electrode 6.

After the substrate 1 has been subject to plasma treatment in phosphine gas, an amorphous silicon layer, which will make the semiconductor layer 7, is formed over the source electrode 4, the transparent dielectric film 3 and the drain electrode 5 by plasma-enhanced chemical vapor deposition (hereinafter, "chemical vapor deposition" is referred to simply as "CVD") by a thickness in the range of 0.03 $\mu$m to 0.3 $\mu$m, a silicon nitride or silicon dioxide film, which will make the gate insulating film 8, is formed over the amorphous silicon layer by plasma-enhanced CVD by a thickness in the range of 0.2 $\mu$m to 0.6 $\mu$m, and a metal film made of metal such as chromium, tantalum, molybdenum and aluminum, which will make the gate electrode 9, is formed over the silicon nitride or silicon dioxide film by sputtering by a thickness in the range of 0.1 $\mu$m to 0.5 $\mu$m.

Then, the metal film is patterned into a desired pattern by photolithography and dry etching to thereby form the gate electrode 9 and the gate bus wirings 21. Subsequently, the silicon nitride or silicon oxide film and the amorphous silicon layer are patterned by etching either by employing the photoresist mask common to the mask used for patterning the gate electrode 9 or by employing the thus patterned metal film from which a photoresist layer is removed, as a mask, to thereby form the gate insulating film 8 and the semiconductor layer 7. Thus, there is completed the active matrix substrate.

As mentioned above, the active matrix substrate in accordance with the instant embodiment can be fabricated by carrying out photolithography steps only twice.

On the other hand, the opposing substrate is fabricated by forming the color filter 12 on the glass substrate 13, and then forming an ITO film on the color filter 12 by sputtering as the transparent common electrode 11. The color filter 12 includes a light-impermeable portion and colored portions including red, green and blue portions.

Then, orientation films (not illustrated) are applied onto both the transparent common electrode 11 of the substrate 13, and TFT 20 and the pixel electrode 6 of the substrate 1. Then, the substrates 1 and 13 are disposed in facing relation with 3–8 $\mu$m-diameter plastic balls interposed therebetween so that the orientation films face each other, and are adhered to each other with sealing resin. Thereafter, liquid crystal material is introduced through an opening having been in advance formed at a certain location of the sealing resin, and then the opening is closed. The liquid crystal material contains two or more kinds of dichroism pigments and optically active substance having chirality. Thus, there is obtained a guest-host mode reflection type liquid crystal display.

The guest-host mode utilizes a phenomenon that when pigments, which are bar-shaped molecules having dichroism, are introduced into liquid crystal, the pigments are oriented in accordance with liquid crystal molecules to a high degree. More specifically, the guest-host mode is based on a principle that pigment molecules stand when liquid crystal molecules stand relative to an incident plane through which a light is transmitted, in which case a light transmits through a liquid crystal layer, whereas pigment molecules lie when liquid crystal molecules lie relative to an incident plane through which a light is transmitted, in which case a light is absorbed into pigments and cannot transmit through a liquid crystal layer. The guest-host mode can be applied to an optical switching device. It would be possible to absorb all lights having a wavelength belonging to a visible range by adding two or more kinds of dichroism pigments into liquid crystal.

The guest-host mode makes it no longer necessary to use a polarizing plate which was necessary to use in a conventional twist nematic type liquid crystal display. Thus, a problem that only one polarization element of a light can be utilized by a polarizing plate can be solved, and as a result, a light efficiency can be significantly enhanced.

In the above-mentioned first embodiment, the roughened surface of the substrate 1 has the projections and recesses defined by the difference "h" in height in the range of 0.4 $\mu$m to 1.2 $\mu$m and the pitch "p" in the range of 5 $\mu$m to 15 $\mu$m. According to the results of the experiments the inventors had conducted, when the difference "h" in height is in the range of 0.1 $\mu$m to 5 $\mu$m both inclusive and the pitch "p" is in the range of 0.5 $\mu$m to 50 $\mu$m both inclusive, optically excellent projections and recesses are obtained.

It should be noted that the insulating substrate 1 may be roughened by sand-blast where fine particles are intensively blown onto a surface of a substrate to thereby form desired projections and recesses, in place of by being rubbed with sand.

In addition, the transparent dielectric film 3 may be made of polymer such as polyamide, polyester, acrylic resin, epoxy resin, silicone resin, and polysilazane, or of material mainly containing them, as well as of polyimide family resin.

[Embodiment 2]

Figure 5:
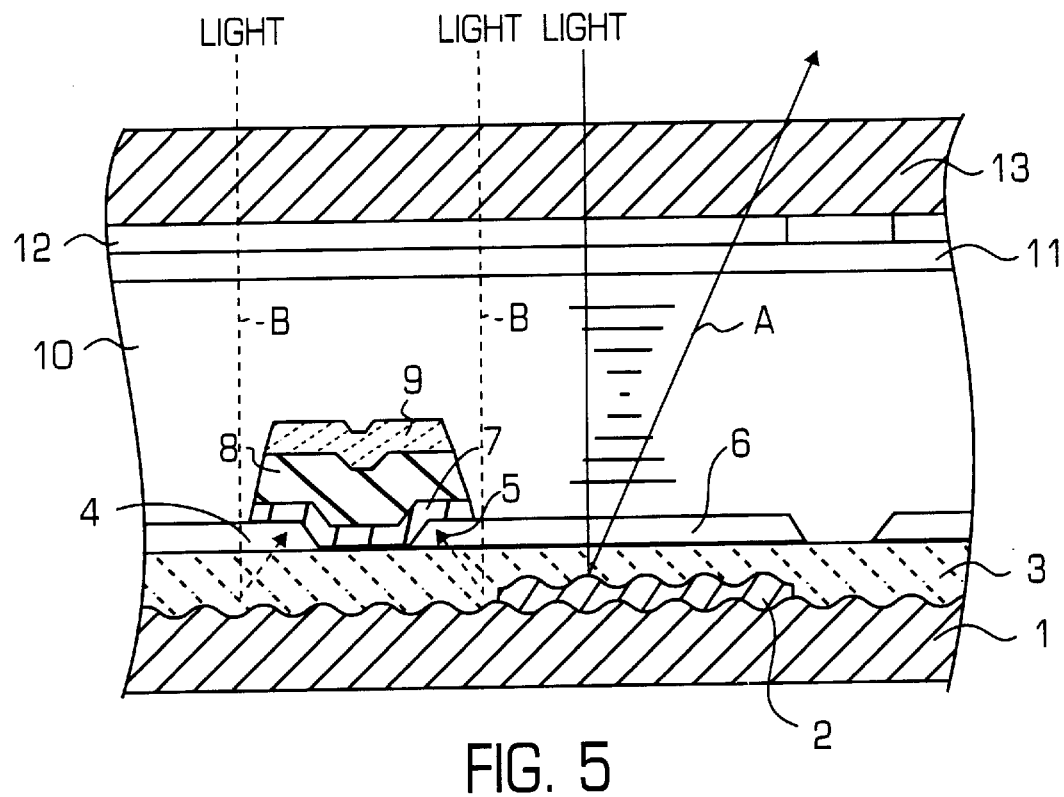
FIG. 5 is a partial plane view of a reflection type liquid crystal display in accordance with the second embodiment of the invention.
Figure 6:
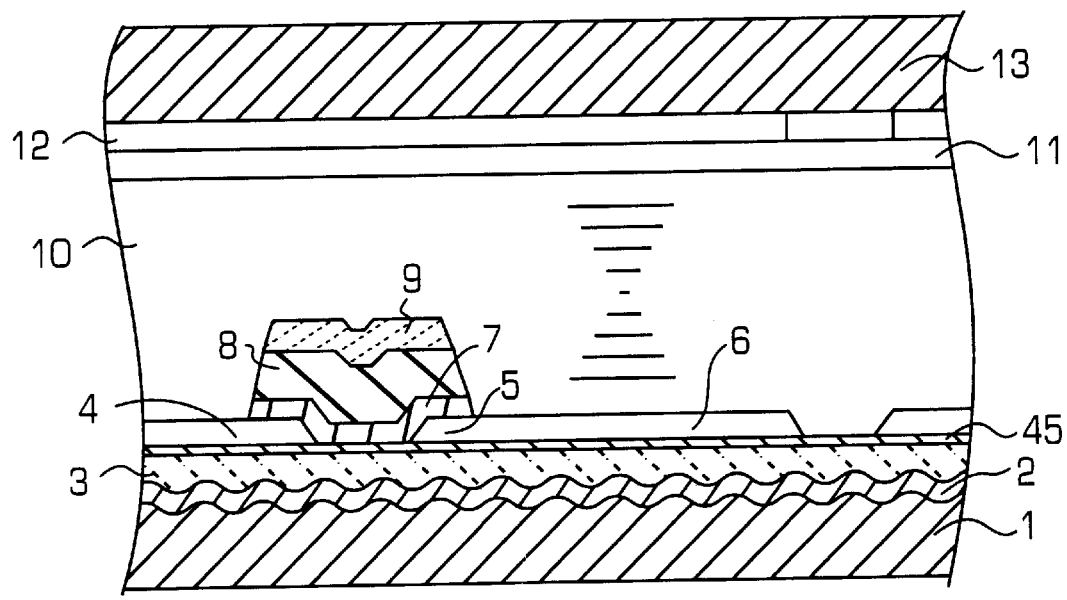
FIG. 6 is a partial plane view of a reflection type liquid crystal display in accordance with the third embodiment of the invention.

FIG. 5 illustrates a reflection type liquid crystal display in accordance with the second embodiment. The second embodiment has almost the same structure as that of the first embodiment, but is different from the first embodiment only in that the metal film or light diffusion and reflection film 2 is formed only below the transparent pixel electrode 6, and that the metal film 2 except a region below the transparent pixel electrode 6 is removed.

If the transparent pixel electrode 6 were formed under TFT 20 like the first embodiment, a light reflected at the light diffusion and reflection plate 2 tends to enter the semiconductor layer 7, as indicated with broken lines B. If a light would enter the semiconductor layer 7, an off-resistance in the semiconductor layer 7 is decreased, and accordingly a leakage current is increased with the result that display grade is deteriorated. Hence, in the second embodiment, a portion of the light diffusion and reflection light 2 located under the semiconductor layer 7 is removed to thereby significantly reduce a light from entering the semiconductor layer 7. Namely, a light reflected at the light diffusion and reflection plate 2 is not directed to the semiconductor layer 7, as indicated with a solid line A.

The reflection type liquid crystal display in accordance with the second embodiment is fabricated as follows. First, the glass substrate 1 is roughened similarly to the first embodiment 1, and then a metal film is deposited on the thus roughened glass substrate 1 by sputtering. Then, unnecessary portions of the metal film are removed by photolithography and etching to thereby the light diffusion and reflection plate 2 disposed only below the pixel electrode 6. The subsequent steps are the same as those of the first embodiment. Thus, there is obtained the reflection type liquid crystal display in accordance with the second embodiment.

In accordance with the second embodiment, the active matrix substrate can be fabricated by carrying out photolithography steps three times.

[Embodiment 3]

A reflection type liquid crystal display in accordance with the third embodiment is almost the same as the first embodiment, but is different only in that an inorganic film 45 is formed on the transparent dielectric film 3. The pixel electrodes 6 and TFT 20 are formed on the inorganic film 45 similarly to the first embodiment.

In the reflection type liquid crystal display in accordance with the first embodiment, the transparent dielectric film 3 makes direct contact with the semiconductor layer 7. Hence, there may be caused a problem that an interface level at an interface between the transparent dielectric film 3 and the semiconductor layer 7 may be increased, and that the semiconductor layer 7 may absorb impurities contained in the transparent dielectric film 3 to thereby deteriorate performances of a thin film transistor, in dependence on material of which the transparent dielectric film 3 is made. It is possible to avoid the semiconductor layer 7 from making direct contact with the transparent dielectric film 3 by forming the inorganic film 45 between the transparent dielectric film 3 and the semiconductor layer 7.

The inorganic film 45 may be made of material often employed as an insulator in the field of fabrication of a semiconductor device. For instance, the inorganic film 45 is made of silicon dioxide and silicon nitride. In the instant embodiment, the inorganic film 45 is designed to have a thickness in the range of 0.03 μm to 0.2 μm.

[Embodiment 4]

Figure 7:
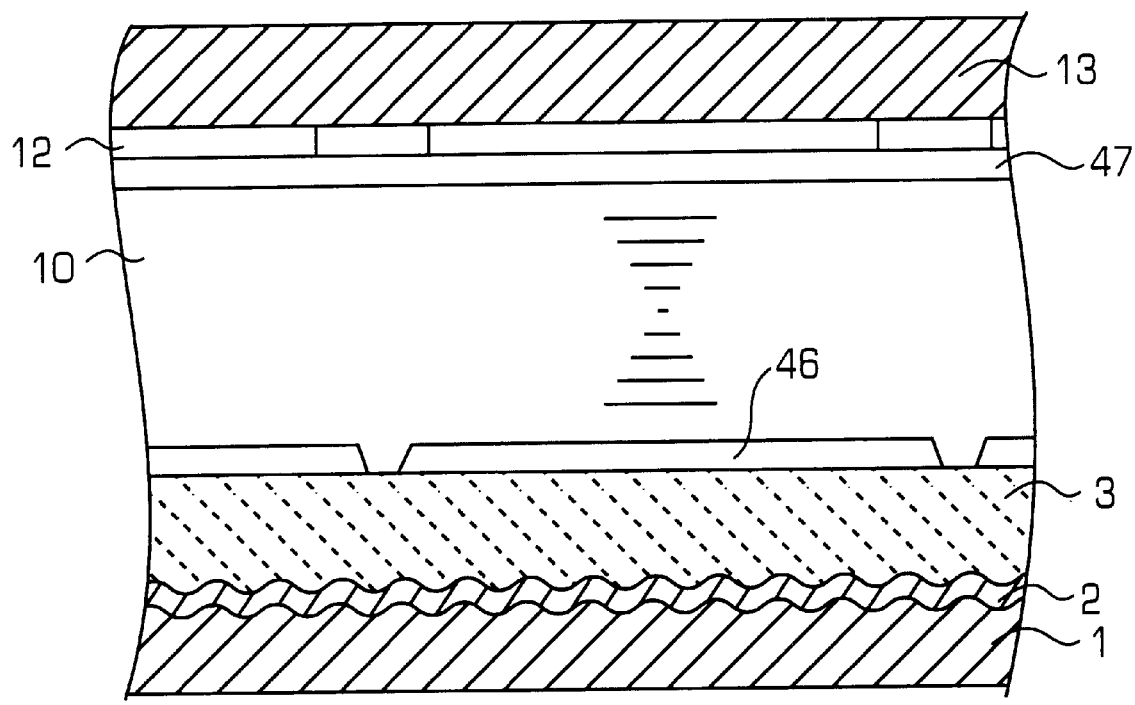
FIG. 7 is a partial plane view of a passive matrix substrate for a reflection type liquid crystal display in accordance with the fourth embodiment of the invention.

The invention may be applied to a passive matrix type liquid crystal display. The fourth embodiment relates to a passive matrix type liquid crystal display to which the invention is applied. FIG. 7 illustrates a liquid crystal display in accordance with the fourth embodiment.

A passive matrix type liquid crystal display makes a display in dependence only on variation in an effective voltage applied to liquid crystal without using a switching device as TFT. As illustrated in FIG. 7, a reflection type liquid crystal display in accordance with the fourth embodiment does not include TFT.

As illustrated in FIG. 7, a passive matrix substrate in the instant embodiment includes an insulating substrate 1 having an upper surface roughened or having projections and recesses, a metal film 2 formed all over the insulating substrate 1 and made of metal such as aluminum, silver, gold and copper, a transparent dielectric film 3 formed all over the metal film 2, made of polyimide family resin, and designed to have a planarized surface, a plurality of column electrodes 46 formed on the transparent dielectric film 3, and an orientation film (not illustrated) formed over the column electrodes 46 and treated for orienting liquid crystal molecules.

A substrate disposed in opposing relation to the passive matrix substrate includes a transparent insulating substrate 13 made of glass, a color filter 12 formed on the substrate 13, a plurality of row electrodes 47 formed on the color filter 12, and extending in a direction perpendicular to a direction in which the column electrodes 46 extend, and an orientation film (not illustrated) formed on the row electrode 47.

The substrates 1 and 13 are disposed in facing relation so that the orientation films face each other, and are adhered to each other with sealing resin. A space between the substrates 1 and 13 are filled with the liquid crystal layer 10.

The column electrodes 46 and the row electrodes 47 cooperate with each other to thereby control a voltage applied to the liquid crystal layer 10. Since the column electrodes 46 and the row electrodes 47 act not only as wirings, but also as pixel electrodes, they are made of ITO which is transparent, electrically conductive material.

Since a passive matrix type liquid crystal display makes a liquid crystal display by varying an effective voltage, if too much parasitic capacity were coupled to the column electrodes 46, driving pulses to apply to the row electrodes 47 are distorted with the result of significant deterioration in display quality. Hence, the transparent dielectric film 3 in the instant embodiment is formed thick by spin-coating for reducing a parasitic capacity between the column electrodes 46 and the metal film 2. The transparent dielectric film 3 is designed to have a thickness of 5 μm in the instant embodiment. The transparent dielectric film 3 may have a greater thickness. Since the transparent dielectric film 3 is designed to have a planarizing upper surface, there is no fear that the column electrodes 46 formed on the transparent dielectric film 3 are broken by the projections and recesses of the roughened surface of the substrate 1.

While the present invention have been described in connection with the preferred embodiments, in accordance with the present invention, it is possible to form projections and recesses by simple steps to thereby obtain a light diffusion and reflection plate having suitable reflection property. In addition, the transparent dielectric film formed on the roughened surface of the substrate and having a planarized upper surface makes it possible to make an active matrix substrate by carrying out photolithography steps only two or three times, which is smaller in the number of carrying out photolithography steps than the conventional method of fabricating an active matrix substrate.

Hence, the present invention provides a reflection type liquid crystal display having high display grade and high reliability at a low cost and at a high fabrication yield. In addition, since a design rule for TFT is no longer restricted, a reflection type liquid crystal display can be fabricated in a greater size with higher density.

Furthermore, the present invention provides a reflection type liquid crystal display having a sufficiently high light efficiency, because a reflection plate is incorporated in an active matrix substrate, and it is no longer necessary to use a polarizing plate by utilizing the guest-host mode.

The present invention may be applied to a passive matrix type liquid crystal display.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 8-292408 filed on Nov. 5, 1996 including specification, claims, drawings and summary is incorporated herein by reference in its entirety.

What is claimed is:

1. A method of fabricating a substrate for a reflection type liquid crystal display, comprising the steps of:
   (a) roughening a surface of a substrate;
   (b) forming a metal film on the thus roughened surface of said substrate for reflecting lights therefrom;
   (c) forming a non-polarizing, transparent dielectric film on said metal film so that said transparent dielectric film has a planarized upper surface; and
   (d) forming at least one transparent pixel electrode on said transparent dielectric film;
   wherein said transparent dielectric film is formed by spin-coating polymer on said metal film.

2. The method as set forth in claim 1, wherein said transparent dielectric film is formed by the steps of:
   (a) applying liquid prepolymer on said metal film;
   (b) spreading said prepolymer on said metal film so that said prepolymer has an almost uniform thickness; and
   (c) curing said prepolymer.

3. The method as set forth in claim 1, wherein said polymer includes at least one of polyamide, polyimide, polyester, acrylic resin, epoxy resin, silicone resin, and polysilazane.

4. A method of fabricating a substrate for a reflection type liquid crystal display, comprising the steps of:
   (a) roughening a surface of a substrate;
   (b) forming a metal film on the thus roughened surface of said substrate for reflecting lights therefrom;
   (c) forming a non-polarizing, transparent dielectric film on said metal film so that said transparent dielectric film has a planarized upper surface;
   (d) forming a plurality of transparent pixel electrodes on said transparent dielectric film; and
   (e) forming a plurality of switching devices on said transparent dielectric film so that each of said switching devices is electrically connected with each of said transparent pixel electrodes, and that said transparent pixel electrodes and said switching devices are arranged in a matrix;
   wherein said transparent dielectric film is formed by spin-coating polymer on said metal film.

5. The method as set forth in claim 4, wherein said transparent dielectric film is formed by the steps of:
   (a) applying liquid prepolymer on said metal film;
   (b) spreading said prepolymer on said metal film so that said prepolymer has an almost uniform thickness; and
   (c) curing said prepolymer.

6. The method as set forth in claim 4, wherein said polymer includes at least one of polyamide, polyimide, polyester, acrylic resin, epoxy resin, silicone resin, and polysilazane.

7. A method of fabricating a substrate for a reflection type liquid crystal display, comprising the steps of:
   (a) roughening a surface of a substrate;
   (b) forming a metal film on the thus roughened surface of said substrate for reflecting lights therefrom;
   (c) forming a non-polarizing, transparent dielectric film on said metal film so that said transparent dielectric film has a planarized upper surface;
   (d) forming a plurality of transparent pixel electrodes on said transparent dielectric film; and
   (e) forming a plurality of switching devices on said transparent dielectric film so that each of said switching devices is electrically connected with each of said transparent pixel electrodes, and that said transparent pixel electrodes and said switching devices are arranged in a matrix;
   wherein said surface is roughened in said step (a) so that there are formed projections and recesses having a difference in height in the range of 0.1 $\mu$m to 5 $\mu$m both inclusive.

8. A method of fabricating a substrate for a reflection type liquid crystal display, comprising the steps of:
   (a) roughening a surface of a substrate;
   (b) forming a metal film on the thus roughened surface of said substrate for reflecting lights therefrom;
   (c) forming a non-polarizing, transparent dielectric film on said metal film so that said transparent dielectric film has a planarized upper surface;
   (d) forming a plurality of transparent pixel electrodes on said transparent dielectric film; and
   (e) forming a plurality of switching devices on said transparent dielectric film so that each of said switching devices is electrically connected with each of said transparent pixel electrodes, and that said transparent pixel electrodes and said switching devices are arranged in a matrix;
   wherein said metal film is formed partially on said roughened surface of said first substrate in said step (b).

9. The method as set forth in claim 8, wherein said metal film is formed almost only below said transparent pixel electrodes.

10. The method as set forth in claim 8, wherein said metal film is formed on said roughened surface of said first substrate so as not to exist below said switching devices.

11. The method as set forth in claim 8, wherein unnecessary portions of said metal film is removed by photolithography and etching.

12. A method of fabricating a substrate for a reflection type liquid crystal display, comprising the steps of:
   (a) roughening a surface of a substrate;
   (b) forming a metal film on the thus roughened surface of said substrate for reflecting lights therefrom;
   (c) forming a non-polarizing, transparent dielectric film on said metal film so that said transparent dielectric film has a planarized upper surface;
   (d) forming a film on said transparent dielectric film;
   (e) forming a plurality of transparent pixel electrodes on said film; and
   (f) forming a plurality of switching devices on said film so that each of said switching devices is electrically connected with each of said transparent pixel electrodes, and that said transparent pixel electrodes and said switching devices are arranged in a matrix;

wherein said transparent dielectric film is formed by spin-coating polymer on said metal film.

13. The method as set forth in claim 12, wherein said transparent dielectric film is formed by the steps of:

(a) applying liquid prepolymer on said metal film;

(b) spreading said prepolymer on said metal film so that said prepolymer has an almost uniform thickness; and (c) curing said prepolymer.

14. The method as set forth in claim 12, wherein said polymer includes at least one of polyamide, polyimide, polyester, acrylic resin, epoxy resin, silicone resin, and polysilazane.

15. A method of fabricating a substrate for a reflection type liquid crystal display, comprising the steps of:

(a) roughening a surface of a substrate;

(b) forming a metal film on the thus roughened surface of said substrate for reflecting lights therefrom;

(c) forming a non-polarizing, transparent dielectric film on said metal film so that said transparent dielectric film has a planarized upper surface;

(d) forming a film on said transparent dielectric film;

(e) forming a plurality of transparent pixel electrodes on said film; and (f) forming a plurality of switching devices on said film so that each of said switching devices is electrically connected with each of said transparent pixel electrodes, and that said transparent pixel electrodes and said switching devices are arranged in a matrix;

wherein said metal film is formed partially on said roughened surface of said first substrate in said step (b).

16. The method as set forth in claim 15, wherein said metal film is formed almost only below said transparent pixel electrodes.

17. The method as set forth in claim 15, wherein said metal film is formed on said roughened surface of said first substrate so as not to exist below said switching devices.

18. The method as set forth in claim 15, wherein unnecessary portions of said metal film is removed by photolithography and etching.

* * * * *